INVENTORS
ROYAL R. HAWKINS
JOHN J. RUDOLF JR.
BY
Joseph E. Ryan
ATTORNEY

United States Patent Office 2,939,285
Patented June 7, 1960

2,939,285

ELECTRICALLY CONTROLLED HYDRAULIC DRIVE

Royal R. Hawkins, Minneapolis, and John J. Rudolf, Jr., Hopkins, Minn., assignors to Minneapolis-Honeywell Regulator Company, Minneapolis, Minn., a corporation of Delaware Filed Mar. 19, 1957, Ser. No. 647,103

13 Claims. (Cl. 60—53)

The present invention is directed to motor control and in particular to an improved electric hydraulic servomotor control designed to provide an accurate control of speed therefor.

The primary object of the subject invention is to provide an improved electric-hydraulic servomotor speed control apparatus.

A more specific object of this invention is to provide in an improved electric hydraulic servomotor speed control an arrangement in which a variable speed setting signal is differentially compared with the actual speed of movement of the servomotor and the resultant differential signal is both integrated and connected directly to a summing network wherein these signals are then combined with a position signal fed back from a speed controller which controls the operation of the servomotor with the output of the summing network controlling an amplifying arrangement which controls the energization of the speed controller, the speed controller in turn controlling a variable displacement pump or other variable output hydraulic arrangement energizing the hydraulic motor to vary the speed of operation thereof.

A further object of this invention is to provide an improved alternating current type of electric hydraulic servomotor control which directly integrates the alternating current signal and eliminates the necessity for demodulators in a control circuit.

Another object of this invention is to provide an improved servomotor speed control apparatus in which speed and direction of movement are controlled with a high degree of accuracy and in which speed lag in the movement of the energized motor as compared with the desired speed setting is substantially eliminated.

A still further object of this invention is to provide an improved electric hydraulic servomotor speed control apparatus especially adaptable for operation of machinery including machine tool elements.

These and other objects of this invention will become apparent from a reading of the attached description together with the drawings wherein.

Our invention is directed to an improved electric hydraulic servo speed control apparatus which is extremely useful in the control and positioning of elements of a machine tool as well as in other servo systems. Since the details of the device to be operated form no part of the present invention, we have shown our servo control apparatus only schematically as driving merely a load. The output of the electrical network which will be described in detail is set to control the energization of a torque motor indicated at 10 the movement of which is variable in magnitude and reversible in direction from a neutral position and is mechanically coupled to a pilot valve indicated at 12 through a connection shown as a dotted line at 13, for operating the pilot valve. The pilot valve in turn valves a source of hydraulic or pneumatic control medium to a variable displacement type of pump indicated schematically at 15 to operate on a piston section 18 thereof, the hydraulic connections being indicated as dotted lines at 20. The piston section of the variable displacement pump operates to position a slide block or other stroke control on the same to control the output of the pump. The pump is adapted to be connected to and driven from an electric motor indicated at 25, the mechanical connection between the motor and the variable displacement pump being indicated at 26. Also included on the variable displacement pump is an electrical signal transducer indicated generally at 30 in Figures 1 and 2 as remote from and connected to the pump, which supplies an output variable in magnitude and reversible in sense depending upon displacement of the stroke control or slide block of the variable displacement pump from a neutral position and the magnitude of such displacement. The output of the variable displacement pump is connected through hydraulic connections indicated generally at 32 to a hydraulic motor indicated at 35 the speed of operation thereof being controlled by the rate of flow of hydraulic fluid thereto. It will be understood, although not shown, that some source of hydraulic fluid supply is included. The hydraulic motor 35 in turn drives the load device indicated at 40 through a mechanical connection indicated at 41 which mechanical connection is also connected to a signal generator or D.C. load tachometer indicated at 50, through a driving connection for the generator indicated as a dotted line at 51. It will be recognized that the pilot valve, the variable displacement pump, the electric constant speed driving motor, and the hydraulic motor are shown schematically herein inasmuch as their details are conventional and form no part of the present invention.

Figure 1:
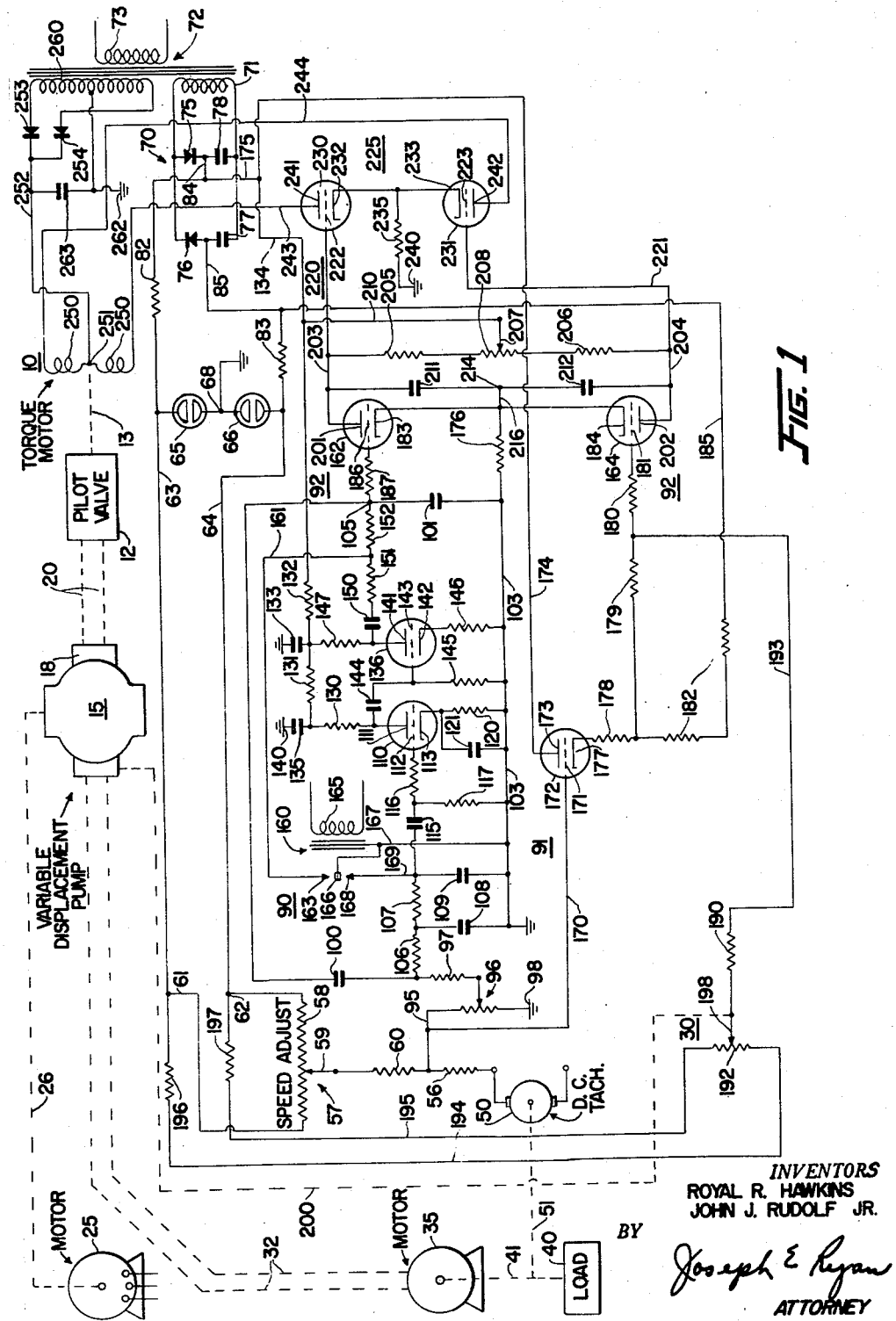
Figure 1 is a schematic circuit of one embodiment of the invention.

Control of the speed of this servo loop is obtained from a primary signal which is a differential between a desired and an actual condition of operation. Thus as shown in Figure 1, the primary signal is a differential obtained between the output of the D.C. load tachometer 50 driven by the hydraulic motor 35 which is connected to a summing resistor 56 and the output from a speed adjustment or setting potentiometer 57 having a winding 58 and a wiper 59, the wiper being connected to a summing resistor 60 in a parallel summing circuit with the summing resistor 56. The speed adjustment or selection potentiometer 57 has its winding 58 connected through conductors 61, 62 to conductors 63, 64 respectively across a pair of voltage regulating tubes or diodes 65, 66. The common connection between the tubes is grounded as at 68. Input to the regulating tubes 65, 66 is obtained from a bridge type rectifier circuit indicated at 70 which is energized from a secondary winding 71 of a main energizing transformer 72 whose primary winding 73 is connected to an alternating current source of power. The bridge type rectifier circuit includes rectifiers 75, 76 connected in parallel and oppositely poled to one extremity of the winding 71 with a pair of condensers 77, 78 connected to the opposite extremity of the winding 71 and in a parallel circuit to the oppositely poled rectifiers to form a bridge circuit the input of which is from a secondary winding 71 and with the connections between the respective rectifiers 75, 76 and condenser 77, 78 forming output tap of the bridge type rectifier. The conductors 63, 64 are connected through voltage dropping resistors 82, 83 respectively to these output terminals or taps of the rectifier circuit identified as at 84, 85. With the common connection between the regulating tube 65, 66 grounded, the conductor 63, 64 will be at a certain voltage levels of opposite potential or polarity. The condensers 77, 78 are included in the bridge type rectifier circuit for filtering purposes. Thus the potentiometer 57 is connected across a D.C. supply such that the extremities of the winding 58 are at opposite polarities and certain voltage levels and a theoretical mid point corresponding to the ground potential of ground connection 68 as a reference ground. Displacement of the wiper 59 with respect to this theoretical midpoint of the winding 58 will produce a signal output across the resistor 60 which will vary in magnitude and polarity depending upon the magnitude of displacement of the wiper from the center position and polarity depending upon the direction of displacement along the winding from the theoretical center position. Thus the potentiometer 57 will supply a reference signal to indicate a desired speed of movement of the servo system and also a desired direction of movement of the servo system depending upon the position of the wiper 59 on the winding 58. The D.C. tachometer 50 supplies an output depending upon its direction of rotation of reversible polarity and of variable magnitude depending upon speed of movement of the motor 35.

This primary signal is fed through two circuits one of which is an integrator indicated generally at 90 and the other of which is a proportioning circuit indicated generally at 91 to be combined at a summing and phase inverting amplifier indicated generally at 92, the details of which will be later described.

The integrating circuit is identical with that shown in the copending application of Willis H. Gille Serial No. 553,337 filed December 15, 1955 on Electronic Integrators and since the details of the integrator are not specifically a part of the subject invention, this portion of the circuit will be described only generally for simplicity purposes. The primary signal from the summing network of resistors 56, 60 is connected through a conductor 95 to a variable potentiometer 96 and a fixed resistor 97, the potentiometer being grounded at one extremity as at 98 to place the summing signal across the same. The resistors 96, 97 form a part of an RC network for the integrator which includes condensers 100 and 101 across which the signal to be integrated is connected. The condensers 100 and 101 as will be seen in the drawings are serially connected from the extremity of the resistor 97 to a grounded conductor 103, the condensers having a midpoint or common connection 105. In this integrating circuit, the potentiometer 96 is adjustable to vary the signal component applied to the RC network. Connected in parallel with the resistive components 96, 97 of the RC network is a filter network composed of resistor 106, 107 and condensers 108, 109 of which the condensers 108, 109 are connected to the grounded conductor 103. Connected in series with the forementioned filter network is a first amplifying stage 110 in the form of a triode having an anode 111, grid 12 and cathode 113, the grid being connected to the filter network through a coupling condenser 115 and a grid resistor 116 with a grid leak resistor 117 being connected to the grid resistor 116 and the ground conductor 103. Cathode 113 is connected through a cathode resistor 120 and a bypass condenser 121 in parallel therewith to the grounded conductor 103. The anode 111 is connected through a plate resistor 130 to a filter section formed of resistors 131, 132 and condensers 133, 135 to the terminal 84 of the rectifier circuit 70 having a positive polarity to provide a B plus supply for the amplifying section. Connected to this stage of amplification is a second amplifying stage 136 in the form of a triode having an anode 141, a cathode 142 and a grid 143, the grid being coupled through a condenser 144 from the anode 111 of the first amplifying stage and through a grid bias resistor 145 to the grounded conductor 103. The cathode 142 is connected through a cathode resistor 146 to the grounded conductor and the anode 141 is connected through a load resistor 147 and filter section to the positive polarity supply of rectifier circuit 70. The output of the second stage of amplification is condenser coupled through a coupling condenser 150 to a current leveling resistor 151 and an isolation resistor 152 to the common connection 105 between condensers 100 and 101. The A.C. output of the second stage of the amplifier 136 is demodulated through the operation of a vibrator indicated at 160 effecting alternate charging and discharging of condenser 150 resulting in an accumulation of charge on the condenser 101. A conductor 161 is connected from the common connection of resistors 151, 152 to a stationary contact 163 of the vibrator to provide the cyclic connection to ground through a movable contact 166 which is connected through a conductor 167 to the grounded conductor 103. A second stationary contact 168 of the vibrator is connected through a conductor 169 to the filter network and effectively connects the coupling condenser 115 to the ground conductor 103 on every half cycle of energizing circuit power for the vibrator 160 thus grounding the amplifier input on every half cycle of vibrator energization. The effect of this alternate grounding of the amplifier input is such that a pulsing input signal is provided for amplifier operation. It will be noted that the output of the amplifier section is grounded at the time an input signal is impressed on amplifier 110 consequently the amplified pulse will produce a change of charge on condenser 150. One half cycle of the vibrator operation later, the input is grounded and the accumulated charge on condenser 150 is effectively transferred to condenser 101 through resistors 151, 152, and as a result the average voltage drop across the condensers 100, 101 is kept at a very small value. Thus, as mentioned in the previously identified Gille application, the magnitude of the integrated signal will appear across the condenser 101 but the total potential applied across the input of the amplifier or in effect the condensers 100 and 101 in series will be substantially reduced. The current flowing in the resistors and condenser components of the RC network continues at the rate determined by the adjustment of the potentiometer 96 as long as an input signal is applied to the same. The output of the amplifier provides a voltage across the condenser 101 which is of an opposite polarity to that of condenser 100 and substantially equal in magnitude thereto. A limit to the integrator output is determined only by the saturation point of the amplifier and thus it is possible to integrate various magnitudes of input signal and continue such integration substantially without error within the limits of the amplifier.

This integrated signal is applied to the input of the summing and phase inverting amplifier which includes a pair of triodes 162, 164, respectively, whose cathodes 183, 184, are connected in series to a common cathode resistor 176 which in turn is connected to one extremity of the condenser 101 and ground conductor 103. The triode 162 has its grid 186 connected through a grid resistor 187 to the terminal point 105 across the other side of condenser 101 such that the output of the condenser 101 is applied across the grid 186 of the phase inverting amplifier 92.

The phase inverting amplifier 92 and particularly the triode 164 also has connected to it the second circuit previously referred to upon which the primary signal or the differential signal between actual speed and speed setting is applied. Thus the conductor 95 is connected through a conductor 170 to the grid 171 of a triode 172 whose anode 173 is connected through a conductor 174, 175 to the plus terminal 84 of the rectifier circuit 70 to provide the B plus supply for the triode. This triode is connected in a cathode follower type circuit such that its cathode 177 is connected through a resistor 178 to a summing resistor 179 and through a grid resistor 180 to a grid 181 of the triode 164. The cathode resistor 178 is also connected to a voltage dropping resistor 182, and a conductor 185 through the negative side or terminal or reference point 85 of the rectifier bridge 70 to adjust the bias on cathode 177. Thus the differential signal is connected through the conductor 170 and the triode 172 in a cathode follower type arrangement to the summing resistor 179 of a summing network to be hereinafter described which in turn is coupled to the triode 164. This summing network includes a resistor 190 connected through a conductor 193 to the resistor 179 and grid resistor 180 with the resistor 190 receiving a signal from the signal transducer 30 having a winding 192 connected through conductors 194, 195 respectively and voltage dropping resistors 196, 197 to the conductors 63, 64 having the positive and negative voltages from the rectifier circuit 70 applied thereto. The signal transducer or potentiometer 30 includes a wiper 198 which is connected to the summing resistor 190 and which is actuated through a mechanical connection indicated by the dotted line 200 from the slide block on the variable displacement type pump 15. Thus the potentiometer 30 effectively has positive and negative polarity signals at the extremities of the winding and a theoretical ground at the center of the same such that movement of the wiper on the potentiometer will provide the signal of the reversible polarity and variable magnitude depending upon the relative position of the wiper with respect to the winding. The potentiometer or signal transducer is so connected that the output from the same will provide a negative feedback from the slide block of the variable displacement pump 15 to the amplifier circuit to be later described. Thus the positional output signal from the slide block is summed with the proportioned or differential primary signal through a summing network formed of resistors 179, 190 and applied to the grid 181 of the triode 164 of the phase inverting amplifier 92. Triodes 162, 164 include anodes 201, 202, respectively which are connected through conductor 203, 204 to load resistor 205, 206 which in turn are connected to a common adjustable potentiometer 208 having a wiper 207 connected through a conductor 210 to a conductor 134 leading to the positive terminal 84 of the bridge circuit. Also connected to the anodes 201, 202 are a pair of series connected filter condensers 211, 212 with their common connection 214 being connected through a conductor 216 to a common cathode resistor 176 for the amplifier. The phase inverting amplifier acts as a summing device in that a signal of one polarity appearing across the grid of one of the tubes will effectively be added to a signal of the opposite polarity appearing across the grid of the second tube. Since the output of the integrator is reversed in sign or opposite in sign from the original differential of primary signal fed to the integrating circuit, its presence on the grid 186 of triode 162 will be effectively added to the primary signal which is connected through the second circuit having the cathode follower type output and appearing across the grid 181 of triode 164. Similarly the input appearing across the grid of triode 164 is effectively added to the input signal of the opposite polarity applied to the grid of the triode 162. The output of the signal transducer 30 connected to the slide block of the variable displacement pump is summed with the output of the proportioning circuit for the primary signal being effectively added in the reverse sense to the primary signal to provide negative feedback and is also summed with the integrated primary signal in the phase inverter or amplifier 92. The output of the phase inverter appears across the resistors 205, 206, which are connected through conductor 203, 221, to the grids 222, 223 of a pair of triodes forming a push pull amplifier 225. The amplifying section 225 includes a pair of triodes 230, 231 having cathodes 232, 233, respectively, which are connected in common through a cathode resistor 235 to a ground connection 240 and having anodes 241, 242, respectively, which are connected through conductors 243, 244 to the extremities of the composite winding 250 of torque motor 10 which winding has a common connection at 251. The connection 251 of the torque motor or torquer winding 250 is connected through a conductor 252 to a pair of half-wave rectifiers 253, 254 connected respectively to the extremities of a secondary winding 260 energized from the primary winding 73 of the main energizing transformer 72. A filter condenser 263 is connected from the conductor 252 to the center of the transformer secondary 260 for filtering purposes being grounded at 262. Thus the anodes 241, 242 of the amplifying section 225 are energized from a rectifier circuit in series with the secondary transformer winding 260 such that the halves of the torquer winding 250 are oppositely energized and are connected through the anodes of the push pull type amplifier so that the energization of these halves of the torquer winding are selectively controlled. Thus the summed output of the phase inverting amplifier 92 appearing across the resistors 205, 206, 208 and applied to the grids of the triodes 230, 231 of amplifier 225 will vary the condition of energization of the same to vary the current flow through the halves of the torque motor winding 250 and produce a movement of the torque motor in proportion to the magnitude of the summed signals fed to the amplifier 92. It will be understood that the amplifier 225 is normally conducting current with no signal across the grids or the input leads to the amplifier 225 and both halves of the torque motor winding 250 will be equally energized such that no movement or operation will result therefrom. It should further be recognized that the output of the phase inverter will be such that the resultant sense and magnitude of the signal applied to the grids 222, 223 of amplifying triodes 230, 231 from the output of the amplifier 92 will effectively cause one side of the torque motor winding to be energized more than the other resulting in operation of the torque motor. A reversal in sense of the input signals to the amplifier 92 will reverse the polarities of the input signals on the grids of the amplifier 225 thus reversing the direction of operation of the torque motor by effectively exciting the opposite half of the winding 250 from the previously considered. An increase in magnitude of the summed output signal of the amplifier 92 will of course vary the differential energization of the winding 250 and vary the magnitude of operation of the torque motor.

In operation, the servo speed control apparatus operates to provide uniform speed control in response to the setting signal and to prevent lag in the motor speed operation from the desired speed of operation. Although we have shown our reference source herein as an adjustable signal transducer which would be manually adjusted, it is expected that this signal producing device may take various forms when the control circuit is applied to various equipments. Thus in machine tool operation in the control of speed of an element thereof, this reference signal may well be a speed of another part of the machine to which the subject control apparatus is to be referenced.

In the present control apparatus, the desired speed as evidenced by the setting potentiometer 57, is compared with the actual speed of the element to be controlled as evidenced by the tachometer 50 and the resultant differential signal is fed through a pair of circuits one of which includes an electronic D.C. integrator and the other of which is a proportioning circuit. In the integrator 90, the differential signal is used to energize an RC type of network including a pair of condensers, and in which the input signal is chopped and amplified with the output of the amplifier providing a pulsed D.C. which charges one of the condensers in opposition to the original charging signal. The differential signal is also fed to the second or parallel circuit including an amplifier having a cathode follower type output for impedance matching and isolation purposes and there the output is summed with an output from a third signal transducing device in the form of a potentiometer 30 operated in proportion to the position of the slide block of the variable displacement pump with the summation of the latter two signals being impressed upon the phase inversion type amplifier wherein these signals are summed with the integrated signal and the resultant signal is fed through a push pull type amplifier to control the torquer operating the pilot valve 12 which in turn controls the piston operating the slide block of the variable displacement pump. The variable hydraulic flow output from the pump controls the output or speed of movement of the motor 35 to drive the load. An actual speed signal from motor 35 varies with speed to reduce the differential between the desired setting and actual speed as lag is eliminated in the servo system. The positional feedback from the slide block is of the negative feedback type and operates to stabilize the amplifiers 92, 225. With this arrangement smooth and accurate speed control is obtained over wide ranges of desired speeds of operation.

Figure 2:
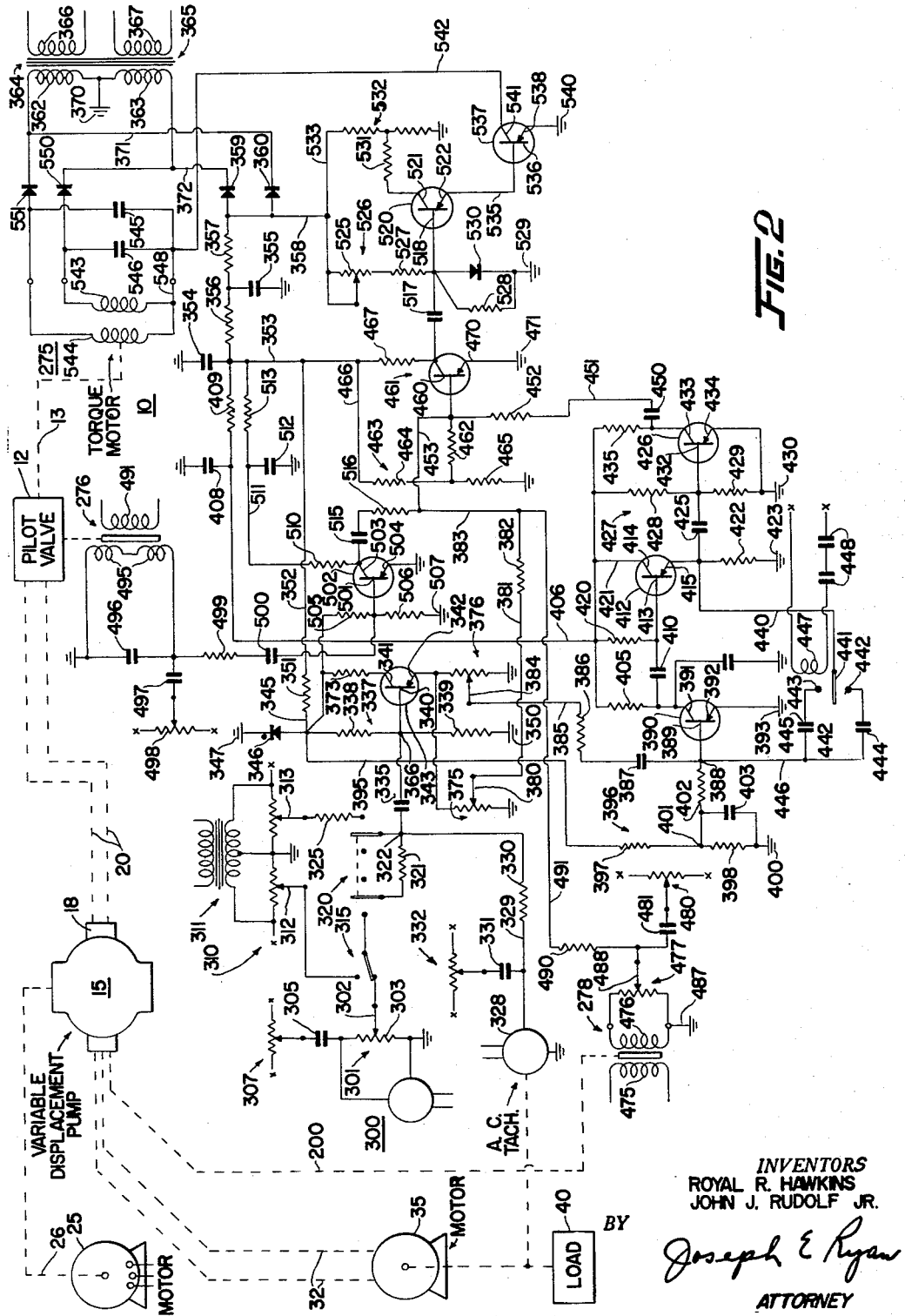
Figure 2 is a schematic circuit of the second embodiment of the invention.

The embodiment shown in Figure 2 performs the same type of operation as the servo control circuit of Figure 1 and differs therefrom in that it is of the alternating current type utilizing transistors in place of vacuum tubes and an alternating current type integrator with an additional feedback loop which will be later defined. The same type of torquer motor unit 10, that is a D.C. torque motor indicated at 275, is mechanically coupled to the pilot valve 12 having a signal transducer 276 associated therewith. Torquer 275 controls pilot valve operation to operate the variable displacement pump 15, having a piston type operator 18 operated from the pilot valve to displace the slide block therein and control the outflow therefrom. The pump 15 is driven from an electric motor indicated at 25 and the output of the pump is coupled as in Figure 1 through a hydraulic connection 32 to a hydraulic motor 35 to operate a load indicated schematically at 40. The variable displacement pump also includes a slide block transducer which is shown in Figure 2 as a variable transformer 278 connected to the pump through a mechanical connection 200. The pilot valve, variable displacement pump, hydraulic motor, and electric motor operate in the same manner as the aforementioned embodiment and these details will be omitted here for simplicity.

In Figure 2, the primary signal source is shown in a somewhat modified form in that it employs a signal generator or tachometer 300 whose output is connected to a potentiometer 301 having a wiper 302 and a winding 303, the winding being grounded at one extremity and connected through a condenser 305 to a second potentiometer 307 which is energized from a source identified in the drawing as XX, this source being of the alternating current type. The potentiometer 307 and condenser 305 form a quadrature nulling arrangement for the output of the tachometer or generator 300, the potentiometer being adjusted and the capacitance being so chosen that no signal will appear across the potentiometer 301 when the motivating device for the signal generator or tachometer is inactive. We have shown herein the desired portion of the primary signal as a speed indicating apparatus or generator as distinguished from the setting device such as a potentiometer in Figure 1 to indicate the desired speed setting may be actually the speed of movement of some other part of the machine with which the subject servo system is to be associated and to which the motor driven by the subject control apparatus is to be referenced. Thus, for example, in a machine tool application, the primary desired signal may be the speed of another portion of the machine. In addition to Figure 2, a setting signal is included in the form of a double potentiometer indicated at 310 energized from a transformer 311 and controlled from an alternating source of power, the potentiometers having wipers 312 and 313, respectively on portions of the windings to either side of the center tap position. It will be noted that the transformer output is labeled XX and corresponds to the potentiometer energization sources for the quadrature nulling potentiometers 307 and those to be later identified. The potentiometer wiper 302 is connected through a switch 315 which in one position is connected to the wiper 302 and in a second position is connected to the wiper 312 with the movable element of the switch being connected to a second two position switch 320 which in one position is connected to a summing resistor 321 to a reference point indicated at 322. The potentiometer wiper 313 is connected through a resistor 325 to a second position for the switch and beyond the summing resistor 321 to the reference point 322.

With this arrangement of the switches 315 and 320, the output of the signal generator may be connected through the summing resistor 321 through the first positions of the switches 315 and 320 to the reference point 322 to give desired speed reference setting as determined by the generator 300. Should it be desired that the reference signal be manually controlled, the switch 315 may be positioned to a second position in which the potentiometer wiper 312 is connected to the summing resistor 321 and in which the potentiometer 301 is disconnected, in which case a manual setting is obtained for one desired direction of movement and depending upon the adjustment of the wiper for a particular speed setting. By movement of the switch 320 to its second position in which the wiper 313 is connected through the resistor 325 and to the common point 322, the summing resistor 321 is effectively taken out of the circuit as well as the potentiometer wipers 302 and 312 such that a reverse direction of rotation is selected and a desired speed setting in a reverse direction is obtained by adjustment of the wiper 313 with respect to its winding. Both of these signals whether they be from the manual setting device in the form of the double potentiometer 310 or the signal generator 300 are connected differentially with an A.C. tachometer 328 which is driven by the motor 35 in proportion to its speed of movement and which is connected through a conductor 329 and a summing resistor 330 to the reference point 322. Also included in this circuit is a nulling condenser 331 and a potentiometer 332 which is energized from the source indicated XX or the transformer 311 for null balance purposes. The signals appearing across the summing resistors 321, 330 are summed differentially and appear at the reference point 322 wherein they are condenser coupled through a condenser 335 to a mid-point 336 of a potential dividing circuit indicated generally at 337 and formed of resistors 338 and 339 and from the mid-point to a base 340 of a transistor having a collector 341 and an emitter 342. The voltage dividing section 337 is energized from a conductor 345 having a voltage regulating device such as a Zener diode indicated at 346 connected thereto, the diode being grounded as at 347 and the opposite extremity of the divider being grounded as at 350. The conductor 345 is connected to a voltage dropping resistor 351 through a conductor 352 and a conductor 353 to a pair of filter sections comprising condensers 354, 355 and resistors 356, 357 respectively to a conductor 358 to which are connected a pair of diodes 359, 360. The diodes are connected such that their cathodes are connected to the extremities of a pair of series connected secondary windings 362, 363, respectively, of energizing transformers 364, 365 and the opposite elements are connected in common with conductor 358. The transformers have primary windings 366, 367 which are connected to an alternating current source of power. The common connection between the secondary windings 362, 363 is grounded as at 370 and conductors 371, 372 connect the diodes to the ungrounded extremities of the secondary windings. These diodes are so connected that a negative potential is applied across the filter sections formed of the resistors 356, 357 and grounded condensers 354, 355 such that a negative potential appears at the conductors 353, 352 and across the dropping resistors 351. The transistor 343 has its collector 341 connected through a resistor 373 to the conductor 345 to provide a common collector type of circuit and emitter 342 is connected to potentiometers 375, 376, respectively which as will be further described are gain potentiometers for the proportioning and integrating circuits.

In this embodiment as in Figure 1, a plurality of circuits are employed such that the differential signal is integrated and slightly modified or proportioned and thereafter combined, to be amplified for controlling purposes. Thus the potentiometer 375 is the proportional gain control and has a wiper 380 which is connected through a conductor 381 and a summing resistor 382 to a reference conductor 383 for the network at which point it will be recombined with the integrated signal. The integrating gain potentiometer 376 has a wiper 384 which is connected through a conductor 385, resistor 386, condenser 387 to a reference point 388 of the integrator. The point 388 is connected to a base 389 of a transistor 390 having a collector 391 and an emitter 392 which is grounded as at 393. Also connected to the reference point 388 of base 389 is a voltage reference signal extending from the conductor 345 and the Zener diode or regulating device 346 through a conductor 395 to a voltage dividing circuit 396 formed of resistors 397, 398, the resistor 398 being grounded as at 400 and the common reference point 401 between the voltage dividing resistors being connected through a resistor 402 to the point 388 and the base of the transistor 390. A filter condenser 403 is connected across the resistor 398 for filtering purposes. The collector 391 of the transistor 390 which serves as a first amplifying stage for the integrator is connected through a resistor 405 to a conductor 406 which in turn is connected through a filter section formed of a resistor 409 and condenser 408 to the filter sections consisting of resistors and condensers 354, 356 and 355, 357 to the voltage supply at the conductor 358. The collector is also condenser coupled through a condenser 410 to a second transistor amplifier in the form of a transistor 412 having a base 413, collector 414, and emitter 415, the condenser being connected to the base 413 and through a resistor 420 to the conductor 406 of the negative power supply. The collector 414 is also connected to the conductor 406 through a conductor 421 to provide a common collector type of connection for the second stage of the amplifier and the emitter is connected through a resistor 422 to a ground connection 423 in an emitter resistor circuit the purpose of which will be later identified. The output of the second stage of amplification 412 of the integrator is condenser coupled through a condenser 425 to a voltage dividing circuit indicated at 427 having resistors 428 and 429 connected in series and to the conductor 406 and ground 430 with a common connection between the resistors being connected to a base 432 of an amplifying section or transistor 426. The transistor 426 amplifies the output of the integrator and includes a collector 433 and an emitter 434 which are connected respectively through a collector resistor 435 to the negative power supply conductor 406 and to the ground 430. The emitter 415 of the second stage of the amplification 412 is connected through a conductor 440 to a movable contact 441 of a vibrating element having stationary contacts 442, 443 which are connected respectively to condensers 444, 445, the positive plates of the condensers being connected to a common conductor 446 leading to the input point 388 and the base of the first transistor 390. The vibrator includes an energizing coil 447 connected through condensers 448 for phase shifting purposes to the XX power supply of the transformer 311. In this integrator, the alternating current input signal is amplified by the two stages of RC coupled transistors. An emitter resistor 422 in the emitter circuit of the second transistor provides a feedback path for the output of the amplifier back to the input of the first amplifier. A synchronous vibrator formed of the coil 447 and the contacts 441–443 which is driven by an alternating current potential of the same frequency as the input signal, alternately connects the feedback path through the condensers 444 and 445, which condensers are identical. The capacitor feedback around the amplifier provides an integrator circuit in which the integrated signal appears across the emitter resistor 422 and is condenser coupled through the condenser 425 to an amplifying stage 426. In considering the operation of the integrator itself, it should be noted that under quiescent condition with no input signal, the second transistor amplifier will conduct sufficient current to develop potential across the emitter-resistor 422. Since the synchronous vibrator alternately connects the condensers 444, 445 to the emitter, these capacitors or condensers will charge to a quiescent potential level. Considering a sine wave signal of input applied to the input terminals or point 388, during a positive half-cycle of the sine wave the conduction of the first transistor amplifier will be reduced and the conduction of the second transistor amplifier will tend to increase. An increase in the conduction of the second transistor results in a larger potential drop across the emitter resistor 422 which makes the emitter more negative. If during the half-cycle, the synchronous vibrator is connected to the condenser 444 a charging current will tend to flow into this condenser to charge the same to the new emitter potential of the second transistor. This charging current is in a direction to turn on the first transistor and opposes the input signal. Thus an abrupt rise in the input signal is not immediately fed to the input terminals of the amplifier but gradually increases at a rate determined by the time constant of the charging circuit. This time lag also occurs when the input signal is removed. During the second half-cycle of the input signal, the negative going half-cycle, the synchronous vibrator connects the condenser 445 to the feedback circuit which connection causes the second transistor to conduct less, whereupon the integrating capacitor 445 begins to discharge its quiescent voltage charge. Thus it is seen that by switching between the two integrating condensers at the frequency of the input signal, it is possible to integrate the A.C. directly. This integrated output as indicated above is amplified again and is condenser coupled through a condenser 450 and through a conductor 451 to a summing resistor 452 which is connected through a conductor 453 to the conductor 383 to which the proportional signal is connected. The conductor 453 is also common to the base 460 of an amplifying transistor 461, the base being connected also to a current limiting resistor 462 and to a potential dividing network 463 having resistors 464, 465 connected through a conductor 466 to the conductor 353 of the negative bias supply. The collector is connected through a resistor 467 to the conductor 353 of the bias supply and the emitter 470 is connected to a ground connection 471. The input stage to this amplifier which is of a conventional amplification type also includes in addition to the summing resistors 382 and 452 a circuit from the slide block of the variable displacement pump transducer 278. The transducer 278 which is driven by the slide block of the variable displacement pump is of the variable transformer type having an alternating current input connected to a primary energizing winding 475 and a secondary winding 476 connected across a potentiometer 477 for gain control purposes and having connected thereto a null balance potentiometer 480 and condenser 481, the potentiometer 480 being energized from the transformer 311 or the XX power supply. The secondary winding 476 of the transducer is grounded as at 487 and the wiper 488 of the ratio potentiometer 477 is connected through a summing resistor 490 and a conductor 491 to the conductor 383 to provide feedback of the transducer 278 to the summation of the integrated and proportional signals appearing across the summing resistors 382 and 452. In addition, the pilot valve 12 also includes a transducer of the variable transformer type having an alternating current excitation on its primary winding 491 and having secondary windings 495 connected across a tuning condenser 496 and to a null balance arrangement including a condenser 497 and a potentiometer 498 which is energized from the transformer 311 or the XX power supply. The output of the secondary windings is connected through a resistor 499 and a condenser 500 to a base 501 of an amplifying transistor 502 having a collector 503 and a grounded emitter 504. The base is energized from the bias conductor 345 through a potential dividing network having resistors 505 and 506 which are connected in series and grounded as at 507 with the mid-point connected to the base 501. The collector is connected through a collector resistor 510 and a conductor 511 to a filter including a grounded condenser 512 and a resistor 513 to the bias conductor 353 for energizing the collector. This transistor stage is coupled through a condenser 515 to a summing resistor 516 common to the conductor 383, 453 and the base 460 of the amplifier 461. This circuit also provides a negative feedback loop from the pilot valve such that the position of the pilot valve in the form of an electrical signal is connected to the summing network and applied with the proportional and integrated signal and also with the negative feedback signal from the slide block of the variable displacement pump to the amplifying section 461 for control of the same. Thus the signals appearing across the summing resistors 490, 382, 452, and 516 are connected in a parallel summing arrangement with the resultant signal supplied to the base 460 of amplifier 461. The amplifier 461 has its collector coupled through a condenser 517 to a base 518 of an impedance matching transistor 520 having a collector 521 and an emitter 522. Base 518 of the transistor 520 is also connected through a voltage dividing network 526 comprising resistors 525, 527 and 528 which are serially connected to a ground 529 and at their other extremity to the conductor 358 and the negative D.C. supply. Connected in parallel with a resistor 528 of the voltage divider is a diode 530 which acts as a clamp on the input of the transistor. Amplifier 520 has its collector 521 connected to the current limiting resistor 531 to a voltage divider circuit 532 which in turn is connected through a conductor 533 to the negative bias conductor 358. The emitter 522 is directly coupled through a conductor 535 to a base 536 of a final output stage transistor 537 having an emitter 538 grounded as at 540 and collector 541 connected to a conductor 542 leading to the coils of the torque motor. Torque motor 275 includes a pair of coils 543, 544 having filter condensers 545 and 546 in parallel therewith and connected in common at a conductor 548 to the conductor 542. The opposite extremities of the torque motor windings are connected through rectifiers 550 and 551, respectively, to the conductors 371, 372 of the energizing transformers 364, 365 and the secondaries 362, 363 serially connected therein. Thus the transformers 364, 365 supply through rectifiers 550, 551 a negative potential to the coils 543, 544, the current through which is controlled by the output of the power amplifier 537. Amplifier 537 is normally conducting such that each coil is equally energized and no resultant movement of the torque motor is obtained. With the summation signal appearing across the amplifiers 461 and 520 of a particular sense, one or the other of the coils will have its energization increased and the other decreased depending upon the sense of the input signal, to vary the resultant direction of movement and the magnitude of movement of the torque motor. This will operate the pilot valve and hence control the variable displacement pump and the motor 35 in proportion to the same.

In considering the operation of this apparatus it will be noted that A.C. circuitry and transistors are utilized herein and that the A.C. signals are directly integrated as well as proportioned and summed with feedbacks from the pilot valve and slide block transducer of the variable displacement pump to provide a resultant error signal operating the torque motor in the direction to diminish the error or primary signal.

It will be seen in the modification in Figure 2 that the desired speed signal or speed setting signal is obtained from an alternating current generator which may be another part of a machine tool with which the subject servo loop is incorporated and that with operation of switches 315 and 320 the input may be from manual setting control such as the potentiometer type setting devices in which the motor may be selectively controlled in a forward or reverse operation and at varying speeds. Either the signal generator 300 or the potentiometer 310 may be selectively switched into the controlling position and their output impressed on the summing resistor 321 or 325 respectively to be compared with the signal of summing resistor 330 associated with the tachometer 328 driven by the motor 35 to provide this primary signal, this differential signal or primary signal is coupled to the amplifier 343 which is of the common collector type and is incorporated primarily for matching purposes. The output of the amplifier 343 is coupled through gain potentiometers for the respective parallel paths leading to the integrator directly to the next stage of amplification.

The power supply which includes the serially connected transformers 364, 365 are connected through rectifiers 359, 360 to provide a negative bias which is filtered through various filter networks and applied to a regulating diode for accurate voltage level control. The voltage controlled through the regulating diode supplies not only the amplifier 343 but also the integrating stage to which the gain potentiometer 376 for the integrator is connected. As previously indicated, the alternating current input signal is integrated by a two-stage RC coupled transistor amplifier with a condenser feedback arrangement. An emitter resistance in the emitter circuit of the second stage of the amplifier provides a feedback path from the output of the amplifier to the input. A synchronous vibrator which is driven by an alternating current potential of the same frequency as the input signal alternately connects the feedback path from one to the other of two condensers or capacitors 445, 444 connected through the vibrator to the input circuit. Thus the positive plates of the condensers 444, 445 are connected together and are connected to the input terminal of the amplifier or the base 389 of the transistor 390. The capacitor feedback around the amplifier provides an integrator circuit which is somewhat similar to a Miller feedback integrator which is well known in the art. The output of the integrator is amplified through the transistor amplifier 426 and fed through the summing circuit along with signals from the signal transducer operated by the slide block of the variable displacement pump and transducer operated by the pilot valve whose output is first slightly amplified through the amplifying tube or transistor 502. The proportional signal, the integrated signal, and the two positional feedback signals are summed in a parallel summing circuit including the summing resistors 490, 382, 516 and 452 and impressed on the base of an amplifier 461. The output of amplifier 461 is connected through amplifiers 520, and 537 which depending upon the phase of the input signals will proportionately control the energization of torque motor windings 543, 544 to control the magnitude and direction of movement of the torque motor operating the pilot valve 12. With the foregoing servo system, smooth, accurate and substantially instantaneous control is provided over the hydraulic motor 35 for driving a device such as indicated schematically by the load 40. With our improved servo control system, lag between the desired speed setting signal and the actual speed is mitigated and extremely accurate control is obtained over a complete range of desired speed settings.

In considering this invention it should be remembered that the foregoing descriptions are intended to be illustrative only and that we wish to be limited only by our appended claims.

We claim as our invention:

1. In a system for operating a controlled element comprising: a speed control member displaceable from a neutral position to control the speed of movement of said controlled element; a primary reference signal means having an output variable in magnitude for determining the speed of operation of said controlled element; means providing a signal dependent upon the speed of operation of said controlled element; means combining said signals in opposition to each other to provide a combined signal; means including an integrating circuit connected to said combining means for integrating at least a portion of said combined signal to provide extremely low speed of movement of the controlled element for a combined signal of small magnitude; means for providing a third signal dependent upon displacement of said speed control member from said neutral position; means for summing said combined signal, the integrated signal and said third signal to provide a resultant signal; and means responsive to said resultant signal for controlling the operation of said speed control member in a direction to reduce said resultant signal.

2. In a control system for controlling the operation of a hydraulic motor comprising: a hydraulic motor, a motor driven variable displacement type pump, fluid connection means connecting said motor to said pump with the speed of said motor being varied in proportion to the fluid output of said pump; valve means connected to and controlling the displacement of said pump to control the fluid output of said pump; torquer means connected to said valve means for controlling the operation of said valve means; a primary reference signal means having an output variable in magnitude for determining speed of operation of said hydraulic motor; means providing a signal dependent upon the speed of operation of said hydraulic motor; means combining said signals in opposition to each other to provide a combined signal, means including an integrating circuit connected to said combining means for integrating at least a portion of said combined signal to provide extremely low speed of movement of said hydraulic motor for a combined signal of small magnitude; means for providing a third signal dependent upon the displacement of said valve for said pump from a reference position with operation of said torquer means; means for summing said combined signal, the integrated signal and said third signal to provide a resultant signal; and means responsive to said resultant signal for controlling the operation of said torquer means to reduce the resultant signal.

3. In a control system for controlling the operation of a hydraulic motor comprising: a hydraulic motor; a motor driven variable displacement type pump; fluid connection means connecting said motor to said pump with the speed of said motor being varied in proportion to the fluid output of said pump; valve means connected to and controlling the displacement of said pump to control the fluid output of said pump; torquer means connected to said valve means for controlling the operation of said valve means; means for providing a primary reference signal which is variable in magnitude and reversible in phase depending upon a desired speed and direction of operation of said hydraulic motor; means for providing an alternating current signal variable in magnitude and reversible in phase dependent upon the actual speed and direction of operation of said hydraulic motor; means for combining these signals in opposition to each other to provide a combined signal; means including an alternating current integrator connected to said signal combining means for integrating at least a portion of said combined signal to provide extremely low speed of movement of said hydraulic motor for a combined signal of small magnitude; means for providing a third alternating current signal variable in magnitude and reversible in phase dependent upon the displacement of said valve for said pump from a reference position; network means for summing the combined signal, the integrated signal and the third signal to provide a resultant error signal; and A.C. amplifier means connected to said network means and controlled by said error signal for controlling the operation of said torquer means and hence the operation of said hydraulic motor in a direction to reduce said error signal.

4. In a system for operating a controlled element comprising: a speed control member displaceable from a neutral position to control the speed of movement of said controlled element and the direction of movement of the controlled element; means for providing a primary alternating current signal which is variable in magnitude and reversible in phase depending upon the desired speed and direction of operation of the controlled element; means for providing an alternating current signal variable in magnitude and reversible in phase dependent upon the actual speed and direction of operation of the controlled element; means for combining these signals in opposition to each other to provide a combined signal; means including an alternating current integrator connected to said signal combining means for integrating at least a portion of said combined signal to provide extremely low speed of movement of said controlled element for a combined signal of small magnitude; means for providing a third alternating current signal variable in magnitude and reversible in phase dependent upon the displacement of said speed control member from said neutral position; network means for summing the combined signal, the integrated signal and the third signal to provide a resultant error signal; and A.C. amplifier means connected to said network means and controlled by said error signal for controlling the operation of said speed control member and hence the operation of said controlled element in a direction to reduce said error signal.

5. In a control system for controlling the operation of a hydraulic motor comprising: a hydraulic motor; a motor driven variable displacement type pump; fluid connection means connecting said motor to said pump with the speed of said motor being varied in proportion to the fluid output of said pump; valve means connected to and controlling the displacement of said pump to control the fluid output of said pump; torquer means connected to said valve means for controlling the operation of said valve means; means for providing a primary reference signal which is variable in magnitude depending upon a desired speed of said hydraulic motor; means for providing an alternating current signal variable in magnitude dependent upon the actual speed of operation of said hydraulic motor; means for combining these signals in opposition to each other to provide a combined signal; means including an alternating current integrator connected to said signal combining means for integrating at least a portion of said combined signal to provide extremely low speed of movement of said hydraulic motor for a combined signal of small magnitude; means for providing a third alternating current signal variable in magnitude and dependent upon the displacement of said valve for said pump from a reference position; network means for summing the combined signal, the integrated signal and the third signal to provide a resultant error signal; and A.C. amplifier means connected to said network means and controlled by said error signal for controlling the operation of said torquer means and hence the operation of said hydraulic motor in a direction to reduce said error signal.

6. In a system for operating a controlled element: means for effecting movement of said element in either of two opposite directions at a variable speed; a primary reference signal having a magnitude and sense selectively variable to determine the speed and direction of movement of the element; a speed controller connected to and operative upon said means effecting said movement of said element and being displaceable in opposite directions from a neutral position to determine the speed and direction of movement of the element; means for providing a second signal having a magnitude and sense indicative of actual speed and direction of movement of said element; circuit means combining the before mentioned signals in opposition to provide a combined signal; additional circuit means for integrating at least a portion of the combined signal to provide an integrated signal which permits extremely low speed of movement of said controlled element for a combined signal of small magnitude; means for providing a position signal having a sense and magnitude depending upon the magnitude and direction of displacement of the speed controller from the neutral position; circuit means summing the position signal, the combined signal and the integrated signal to provide an error signal having a magnitude and sense indicative of the lag in the movement of said element; and control means connected to said circuit means and controlled by said error signal for controlling the direction and magnitude of displacement of said speed controller to reduce the error signal.

7. In a system for operating a controlled element: means for effecting movement of the element at a variable speed; a primary reference signal having a selectively variable magnitude indicative of the desired speed of movement of said element; a speed controller displaceable from a reference position and connected to said means for effecting movement to determine the speed of movement of said element; means for providing a second signal having a magnitude indicative of the actual speed of movement of said element; circuit means combining said primary signal and said second signal to produce a differential between the signals; additional circuit means connected to said combining circuit means for integrating at least a portion of the differential signal to provide an integrated signal which permits extremely low speed of operation of said controlled element for a differential signal of small magnitude; means for providing a position signal variable in magnitude and indicative of the displacement of said speed controller from said neutral position; further circuit means for summing the position signal, the combined signal and the integrated signal to provide an error signal indicative of the lag and the movement of said element; and means responsive to the error signal for operating said speed controller to reduce the error signal and eliminate the lag in movement of said element.

8. In a system for operating a controlled element: means for effecting movement of said element in either of two opposite directions at a variable speed; a primary reference signal having a magnitude and sense selectively variable to determine the speed and direction of movement of the element; a speed controller connected to and operative upon said means effecting said movement of said element and being displaceable in opposite directions from a neutral position to determine the speed and direction of movement of the element; means for providing a second signal having a magnitude and sense indicative of actual speed and direction of movement of said element; circuit means combining the before mentioned signals in opposition to provide a combined signal; means including additional circuit means connected to said combining circuit means for integrating at least a portion of said combined signal to provide an integrated signal which permits low speed of movement of said controlled element for a combined signal of small magnitude; means for providing a position signal having a sense and magnitude depending upon the magnitude and direction of displacement of the speed controller from the reference position; further circuit means connected to said first named circuit means and providing a proportional signal in proportion to said combined signal; network circuit means for summing the position signal, said proportional signal and said integral signal to provide an error signal having a magnitude and sense indicative of the lag in the movement of said element; and control means connected to said circuit means and controlled by said error signal for controlling the direction and magnitude of displacement of said speed controller to reduce the error signal.

9. In a system for operating a controlled element comprising: a speed control member displaceable from a neutral position to control the speed of movement of said controlled element and the direction of said controlled element; a primary reference signal means having an output variable in magnitude and sense for determining the speed and direction of operation of said controlled element; means providing a signal dependent upon the speed and direction of operation of said controlled element; means combining said signals in opposition to each other to provide a combined signal; an integrating circuit for integrating at least a portion of said combined signal to provide extremely low speed of movement of said controlled element for a combined signal of small magnitude; means for providing a third signal dependent upon displacement of said speed control member from said neutral position; circuit means connected in parallel with said integrating circuit means and receiving said combined signal to provide an output proportional to the combined signal; means for summing said output proportional signal, the integrated signal and said third signal to provide a resultant signal; and means responsive to the resultant signal for controlling the operation of said speed control member to reduce said resultant signal.

10. In a control system for controlling the operation of a hydraulic motor comprising: a hydraulic motor; a motor driven variable displacement type pump; fluid connection means connecting said motor to said pump with the speed of said motor being varied in proportion to the fluid output of said pump; valve means connected to and controlling the displacement of said pump to control the fluid output of said pump; torquer means connected to said valve means for controlling the operation of said valve means; a primary reference signal means having an output variable in magnitude and sense for determining speed and direction of operation of said hydraulic motor; means providing a signal dependent upon the speed of operation of said hydraulic motor; means combining said signals in opposition to each other to provide a combined signal; an integrating circuit for integrating at least a portion of said combined signal to provide extremely low speed of operation of said hydraulic motor for a combined signal of small magnitude; means for providing a third signal dependent upon the displacement of said valve for said pump from a reference position with operation of said torquer means; means for providing a fourth signal dependent upon movement of a stroke control of the variable pump which varies the output of said pump, means summing said combined signal; the integrated signal, the third and fourth signals to provide a resultant signal; and means responsive to said resultant signal for controlling the operation of said torquer means to reduce the resultant signal.

11. In a control system for controlling the operation of a hydraulic motor comprising: a hydraulic motor; a motor driven variable displacement type pump; fluid connection means connecting said motor to said pump with the speed of said motor being varied in proportion to the fluid output of said pump; valve means connected to and controlling the displacement of said pump to control the fluid output of said pump; torquer means connected to said valve means for controlling the operation of said valve means; means for providing a primary reference signal which is variable in magnitude and reversible in phase depending upon a desired speed and direction of operation of said hydraulic motor; means for providing an alternating current signal variable in magnitude and reversible in phase dependent upon the actual speed and direction of operation of said hydraulic motor; means for combining these signals in opposition to each other to provide a combined signal; an alternating current integrator connected to said signal combining means for integrating at least a portion of said combined signal to provide extremely low speed of operation of said hydraulic motor for a combined signal of small magnitude; means for providing a third alternating current signal variable in magnitude and reversible in phase dependent upon the displacement of said valve for said pump from a reference position; means for providing a fourth alternating current signal variable in magnitude and reversible in phase dependent upon displacement of a stroke control element included in said pump from a reference position; network means for summing the combined signal, the integrated combined signal, the third and fourth signals to provide a resultant error signal; and A.C. amplifier means connected to said network means and controlled by said error signal for controlling the operation of said torquer means and hence the operation of said hydraulic motor in a direction to reduce said error signal.

12. In a control system for controlling the operation of a hydraulic motor comprising: a hydraulic motor; a motor driven variable displacement type pump; fluid connection means connecting said motor to said pump with the speed of said motor being varied in proportion to the fluid output of said pump; valve means connected to and controlling the displacement of said pump to control the fluid output of said pump; torquer means connected to said valve means for controlling the operation of said valve means; means for providing a primary reference signal which is variable in magnitude depending upon a desired speed of said hydraulic motor; means for providing an alternating current signal variable in magnitude dependent upon the actual speed of operation of said hydraulic motor; means for combining these signals in opposition to each other to provide a combined signal; an alternating current integrator connected to said signal combining means for integrating at least a portion of said combined signal to provide extremely low speed of operation of said hydraulic motor for a combined signal of small magnitude; means for providing a third alternating current signal variable in magnitude and dependent upon the displacement of said valve for said pump from a reference position; means for providing a fourth alternating current signal variable in magnitude dependent upon displacement of a stroke control element included in said variable pump; network means for summing the combined signal, the integrated combined signal, the third and fourth signals to provide a resultant error signal; and A.C. amplifier means connected to said network means and controlled by said error signal for controlling the operation of said torquer means and hence the operation of said hydraulic motor in a direction to reduce said error signal.

13. In a system for operating a movable element: means for effecting movement of said element in either of two opposite directions at a variable speed; a primary reference signal having a magnitude and sense selectively variable to determine the speed and direction of movement of the movable element; a speed controller connected to and operative upon said means effecting said movement of said movable element and being displaceable in opposite directions from a neutral position to determine the speed and direction of movement of said movable element; means for providing a second signal having a magnitude and sense indicative of actual speed and direction of movement of said movable element; circuit means combining the before mentioned signals in opposition to provide a combined signal; additional circuit means for integrating a portion of the combined signal to provide an integrated signal which permits low speed of operation of said movable element for a combined signal of small magnitude; means for providing a position signal having a sense and magnitude depending upon the magnitude and direction of displacement of the speed controller from the neutral position; circuit means summing the position signal, the combined signal and the integrated signal to provide an error signal having a magnitude and sense indicative of the lag in the movement of said movable element; and control means connected to said circuit means and controlled by said error signal for controlling the direction and magnitude of displacement of said speed controller to reduce the error signal.

References Cited in the file of this patent

UNITED STATES PATENTS

| | | |
|---|---|---|
| 2,654,999 | Berge | Oct. 13, 1953 |
| 2,776,536 | Chudyk | Jan. 8, 1957 |
| 2,790,303 | Kutzler | Apr. 30, 1957 |
| 2,800,769 | Newell | July 30, 1957 |